US011377566B2

(12) United States Patent
Mollat Du Jourdin et al.

(10) Patent No.: US 11,377,566 B2
(45) Date of Patent: Jul. 5, 2022

(54) AQUEOUS BINDER COMPOSITIONS

(71) Applicant: BASF SE, Ludwigshafen am Rhein (DE)

(72) Inventors: Xavier Mollat Du Jourdin, Uccle (BE); Jochen Gattermayer, Ludwigshafen am Rhein (DE); Joost Leswin, Ludwigshafen am Rhein (DE); Ivan Cabrera, Ludwigshafen am Rhein (DE); Anna Maria Mueller-Cristadoro, Lemfoerde (DE); Benedikt Crone, Waterloo (BE)

(73) Assignee: BASF SE, Ludwigshafen am Rhein (DE)

( * ) Notice: Subject to any disclaimer, the term of this patent is extended or adjusted under 35 U.S.C. 154(b) by 77 days.

(21) Appl. No.: 16/964,384

(22) PCT Filed: Jan. 22, 2019

(86) PCT No.: PCT/EP2019/051411
§ 371 (c)(1),
(2) Date: Jul. 23, 2020

(87) PCT Pub. No.: WO2019/145265
PCT Pub. Date: Aug. 1, 2019

(65) Prior Publication Data
US 2020/0347238 A1 Nov. 5, 2020

(30) Foreign Application Priority Data
Jan. 23, 2018 (EP) .................................... 18152974

(51) Int. Cl.
*C08F 2/22* (2006.01)
*C09D 5/02* (2006.01)
*C09D 7/65* (2018.01)
*C09D 133/06* (2006.01)

(52) U.S. Cl.
CPC ............... *C09D 5/022* (2013.01); *C09D 7/65* (2018.01); *C09D 133/064* (2013.01)

(58) Field of Classification Search
CPC ...... C09D 5/022; C09D 7/65; C09D 133/064; C09D 179/02; C09D 133/10; C08F 2/22; C08L 79/02; C08G 73/024
USPC ........................................................ 524/501
See application file for complete search history.

(56) References Cited

U.S. PATENT DOCUMENTS

| 4,500,735 | A | 2/1985 | Diery et al. |
| 5,393,463 | A | 2/1995 | Fikentscher et al. |
| 5,401,582 | A | 3/1995 | Weyland et al. |
| 5,994,457 | A | 11/1999 | Stanger et al. |
| 6,096,858 | A | 8/2000 | Dobbelaar et al. |
| 6,365,709 | B1 | 4/2002 | Heibel et al. |
| 6,433,132 | B1 | 8/2002 | Wood et al. |
| 6,444,760 | B1 | 9/2002 | Rupaner et al. |
| 6,462,138 | B1 | 10/2002 | Rupaner et al. |
| 7,238,773 | B2 | 7/2007 | Huebinger et al. |
| 8,540,885 | B2 | 9/2013 | Ebert et al. |
| 8,882,904 | B2 | 11/2014 | Mueller-Cristadoro et al. |
| 2010/0056706 | A1* | 3/2010 | Flosbach ............... C08F 220/20 524/556 |
| 2010/0216361 | A1 | 8/2010 | Bruchmann et al. |
| 2011/0168045 | A1 | 7/2011 | Bruchmann et al. |
| 2014/0014004 | A1* | 1/2014 | Mueller-Cristadoro ..................... C08G 65/34 106/499 |

FOREIGN PATENT DOCUMENTS

| DE | 3206459 A1 | 9/1983 |
| DE | 4003422 A1 | 8/1991 |
| DE | 19624299 A1 | 1/1997 |
| DE | 19621027 A1 | 11/1997 |
| DE | 19741184 A1 | 3/1999 |
| DE | 19741187 A1 | 3/1999 |
| DE | 19805122 A1 | 4/1999 |
| DE | 19828183 A1 | 12/1999 |
| DE | 19839199 A1 | 3/2000 |
| DE | 19840586 A1 | 3/2000 |
| DE | 19847115 C1 | 5/2000 |
| EP | 441198 A2 | 8/1991 |
| EP | 771328 A1 | 5/1997 |
| WO | WO-9533775 A1 | 12/1995 |
| WO | WO-2009047269 A2 | 4/2009 |
| WO | WO-2009060060 A1 | 5/2009 |
| WO | WO-2009112379 A1 | 9/2009 |
| WO | WO-2013020771 A1 | 2/2013 |
| WO | WO-2014012812 A1 | 1/2014 |
| WO | WO-2014060456 A2 | 4/2014 |
| WO | WO-2016209691 A1 | 12/2016 |

OTHER PUBLICATIONS

International Preliminary Examination Report for PCT/EP2019/051411 dated Mar. 18, 2020 with Applicant response/amended claims to IPRP.
International Search Report for PCT/EP2019/051411 dated Apr. 11, 2019.
Written Opinion of the International Searching Authority for PCT/EP2019/051411 dated Apr. 11, 2019.

* cited by examiner

*Primary Examiner* — Hannah J Pak
(74) *Attorney, Agent, or Firm* — Faegre Drinker Biddle & Reath LLP

(57) ABSTRACT

The present invention relates to aqueous binder compositions comprising an aqueous polymer latex of a film forming carboxylated polymer and a branched polyetheramine polyol dissolved in the aqueous phase of the aqueous polymer latex, wherein essentially all of the amino groups in the branched polyetheramine polyol are tertiary amine groups. The present invention also relates to water-borne coating compositions containing such an aqueous binder composition.

12 Claims, No Drawings

AQUEOUS BINDER COMPOSITIONS

CROSS-REFERENCE TO RELATED APPLICATIONS

This application is a national stage application (under 35 U.S.C. § 371) of PCT/EP2019/051411, filed Jan. 22, 2019, which claims benefit of European Application No. 18152974.4, filed Jan. 23, 2018, both of which are incorporated herein by reference in their entirety.

The present invention relates to aqueous binder compositions comprising an aqueous polymer latex of a film forming carboxylated polymer. The present invention also relates to water-borne coating compositions containing an aqueous binder composition according to the present invention.

BACKGROUND OF THE INVENTION

The drying speed of a paint or coating, in particular for outdoor use such as for example a masonry paint or a wood coating, is highly dependent on the weather conditions, in particular the atmospheric humidity, temperature and wind speed during application of the coating. For example, if the drying speed is too low, e.g. because of low temperature and/or high humidity, a sudden rainfall may spoil the coating. In contrast thereto, a high drying speed, e.g. at elevated temperatures and/or low humidity conditions, may result in a too short open times, which may lead to problems when applying the coating under these conditions. Therefore, there is a need for control of the drying speed of a paint or coating, which is less dependent on the weather conditions, to ensure that the paint or coating can be applied at arbitrary weather conditions without showing defects.

Certain additives based on water soluble polymeric amines, such as polyethylene imine, are principally known to increase the drying speed of a paint. These additives provide sufficient drying speed and low paint damage in case of low temperatures and high atmospheric humidity. However, such paints usually suffer from poor storage stability. Furthermore, such paints are difficult to use at high temperatures and low atmospheric humidity because the pot life of the paint may shorten and the coating will dry too fast under these conditions. Moreover, these coatings tend to yellow. Therefore, often two series of coating compositions are offered for professional decorators, one series with increased drying speed for application under cold weather conditions and one series with normal drying speed for application under normal or warm weather conditions.

WO 2014/060456 describes aqueous coating compositions containing an anionically stabilized polymer latex and one or more derivatized polyamines, which contain a plurality of primary amine groups, secondary amine groups or combinations thereof and which are in particular alkoxylated polyethylene imines, together with a volatile base. The derivatized polyamine decreases the setting time of the coating compositions. The coating, however tends to yellow upon exposure to UV light.

Moreover, the drying speed of the coating at higher temperature is too rapid and the open time is too short.

WO 2016/209691 describes a latex composition which comprises an anionically-stabilized latex, at least one volatile base compound, and one or more water soluble polymer (s) having a backbone with a plurality of amine functional groups and hydroxyl functional groups, which is an addition product formed from at least one multifunctional amine compound reacted with one or more polyfunctional epoxy compounds, one or more monofunctional epoxy compounds, or a combination thereof. The application properties are not satisfactory.

SUMMARY OF THE INVENTION

It is an object of the present invention to provide aqueous binder compositions, which overcome the drawbacks of the prior art. In particular, there is the need for binder compositions, which offer sufficiently quick drying under cold and/or humid weather conditions, but also allow for sufficient open time under warm and/or dry weather conditions.

It was surprisingly found that these objectives can be achieved by aqueous binder compositions comprising an aqueous polymer latex of a film forming carboxylated polymer and a branched polyetheramine polyol dissolved in the aqueous phase of the aqueous polymer latex, wherein essentially all of the amino groups in the branched polyetheramine polyol are tertiary amine groups. It was in particular found that the branched polyetheramine polyols as defined herein reduce or eliminate the dependency of the drying characteristics of paints or coatings based on aqueous polymer latex of film forming carboxylated polymers from the application temperature. Therefore, binders comprising a combination of a branched polyetheramine polyol as defined herein and an aqueous polymer latex of a film forming carboxylated polymer can be used to prepare coating compositions having a drying behavior, which is almost independent of the application temperature and which therefore provide an accelerated drying at temperatures below 20° C. and sufficient open time and increased pot life at temperatures above 20° C.

Consequently, a first aspect of the present invention relates to aqueous binder compositions comprising an aqueous polymer latex of a film forming carboxylated polymer and a branched polyetheramine polyol as defined herein dissolved in the aqueous phase of the aqueous polymer latex, wherein essentially all of the amino groups in the branched polyetheramine polyol are tertiary amine groups.

A second aspect of the present invention relates to water-borne coating compositions containing the aqueous binder composition as defined herein.

A third aspect of the present invention relates to the use of an aqueous binder composition as defined herein as a binder or co-binder in water-borne coating compositions.

A further aspect of the present invention relates to a method of producing a coating on a surface comprising applying the aqueous binder composition as defined herein and/or the coating composition as defined herein to the surface, and allowing the composition to dry to produce the coating.

A further aspect of the present invention relates to the use of a branched polyetheramine polyol, wherein essentially all of the amino groups in the branched polyetheramine polyol are tertiary amine groups, in an aqueous polymer latex of a film forming carboxylated polymer, in particular for modifying the drying speed of the polymer latex and paints containing said polymer latex.

The invention described herein has several advantages:

The drying characteristics of the binder compositions of the invention are almost independent of temperatures and provide for coatings having an accelerated drying speed at temperatures below 20° C., in particular of below 15° C. and a sufficient open time at temperatures above 20° C., in particular above 25° C.

The binder compositions are stable over prolonged periods of time, e.g. for more than 14 days, and do not tend to form agglomerates.

The binder compositions and the coatings obtained therefrom show minimal yellowing behavior.

Paints prepared from these binders will be stable over prolonged periods, e.g. for more than 14 days, and have an increased pot life.

DETAILED DESCRIPTION OF THE INVENTION

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. For example, the term $C_1$-$C_{20}$ alkyl denominates a group of linear or branched saturated hydrocarbon radicals having from 1 to 20 carbon atoms.

Similarly, term $C_5$-$C_{20}$ alkyl denominates a group of linear or branched saturated hydrocarbon radicals having from 5 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, 2-butyl, 2-methylpropyl (isopropyl), 1,1-dimethylethyl (tert-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl and their isomers. $C_1$-$C_4$-alkyl means for example methyl, ethyl, propyl, 1-methylethyl, butyl, 1-methylpropyl, 2-methylpropyl or 1,1-dimethylethyl.

Here and throughout the specification, the term "(meth) acryl" includes both acryl and methacryl groups. Hence the term "(meth)acrylate" includes acrylate and methacrylate.

Here and throughout the specification, the term "polymer latex" and "polymer dispersion" are used as synonyms and means an aqueous polymer composition of a water-insoluble polymer, where the polymer is present in the form of finely dispersed polymer particles. Usually, the polymer latex is obtainable by emulsion polymerization (also termed primary latex) but it may also be obtainable by emulsifying a polymer in an aqueous phase (secondary latex).

Here and throughout the specification, the term "polyetheramine polyol" means a polymer having amine groups, ether groups and hydroxyl groups.

Here and throughout the specification, the term "pphm" is the abbreviation for "parts per hundred monomers" and is the weight fraction, based on the total weight of monomers in the respective composition.

Here and throughout the specification, the range "x to y % by weight" is a synonym of the range "x % by weight to y % by weight". Likewise the range "x to y mol-%" is a synonym of the range "x mol-% to y mol-%". For avoidance of any doubt it is emphasized that the same applies for ranges given in "mol/kg", "mg KOH/g", "g/mol", "pphm", "° C." and the like.

According to the invention, the binder composition contains an aqueous polymer latex of a carboxylated polymer and at least one branched polyetheramine polyol. The branched polyetheramine polyol is dissolved in the aqueous phase of the polymer latex. Hence, the polyetheramine polyol is water soluble to at least a certain extent. The water solubility of the branched polyetheramine polyol is preferably at least 5 g/l, more preferably at least 10 g/l, in particular at least 50 g/l, especially 100 g/l, at 20° C. In particular, the branched polyetheramine polyol is completely water miscible at 20° C.

In the branched polyetheramine polyol, which is dissolved in the aqueous phase of the polymer latex, essentially all of the amino groups are tertiary amine groups. In this context, the term "essentially" means that at least 90%, preferably at least 95%, more preferably more than 98%, and even more preferably more than 99% of the amino groups in the branched polyetheramine polyol are tertiary amine groups. Especially, the branched polyetheramine polyol does not have any detectable amounts of secondary and primary amino groups. Thus, in the branched polyetheramine polyol dissolved in the aqueous phase of the polymer latex, all of the amino groups in the branched polyetheramine polyol are tertiary amine groups. Frequently, the branched polyetheramine polyol contains on average less than 0.5 mol/kg of secondary and primary amino groups, if any. In particular, the polyetheramine polyol contains on average less than 0.2 mol/kg, especially less than 0.1 mol/kg of secondary and primary amino groups, if any.

Frequently, the branched polyetheramine polyol contains on average from 4 to 8.2 mol/kg of tertiary amino groups. In particular, the polyetheramine polyol contains on average from 5 to 8.0 mol/kg of tertiary amino groups, especially from 5 to 7.9 mol/kg.

The amine number of polyetheramine polyol is preferably in the range of 100 to 700 mg KOH/g, most preferably in the range of 200 to 500 mg KOH/g, determined according to the method described in DIN EN ISO 9702:1998. Besides determination of the total amine group content, this method allows for determination of the tertiary amine group content, the secondary amine group content, and the primary amine group content.

In addition to the amino groups, the polyetheramine polyol contains hydroxyl groups. The OH number of the polyetheramine polyol is frequently at least 100 mg KOH/g, e.g. 100 to 800 mg KOH/g, in particular at least 200 mg KOH/g, e.g. 200 to 700 mg KOH/g, especially at least 250 mg KOH/g, e.g. 250 to 650 mg KOH/g, determined according to DIN 53240, part 2. The number of hydroxyl groups per molecule will depend on the number average molecular weight of the branched polyetheramine polyol and the degree of branching. Frequently, the branched polyetheramine polyol contains on average (number average) at least four, more preferably at least six, more preferably at least ten, hydroxyl groups per molecule. In principle, there is no upper limit on the number of terminal or pendent functional groups. Preferably, the branched polyetheramine polyol contains on average (number average) at most 500, in particular at most 200 terminal hydroxyl groups per molecule.

The number average molar weight, $M_n$, of branched polyetheramine polyol is frequently in the range of from 500 to 55000 g/mol, in particular in the range from 1000 to 40000 g/mol, determined by gel permeation chromatography using hexafluoroisopropanol as the mobile phase and polymethylmethacrylate as a standard. The weight-average molar weight, $M_w$, of polyetheramine polyol is frequently in the range of from 1000 to 300000 g/mol, in particular in the range from 2000 to 200000 g/mol, and especially in the range from 5000 to 150000 g/mol, determined by gel permeation chromatography using hexafluoroisopropanol as the mobile phase and polymethylmethacrylate as a standard. The polydispersity, i.e. the ratio Mw/Mn, of the polyetheramine polyol is frequently in the range of from 1.1 to 25, in particular in the range of 1.5 to 20.

The dynamic viscosity of the branched polyetheramine polyol is frequently in the range of from 5 to 200 Pa·s, determined at 23° C. according to ASTM D7042, in particular in the range from 8 to 150 Pa·s.

The term "branched" describes that the polyetheramine polyol does not have linear structure, but has a significant amount of branching points within the polymer backbone, which result in a branched polymer chain. Such branching points may be tri- or tetra-substituted carbon atoms and/or tertiary amino groups. The branching points are in particular the tertiary amino groups.

The Hazen color number of the polyetheramine polyol is preferably in the range of from 100 to 600 (APHA), determined according to DIN ISO 6271.

The polyetheramine polyol is frequently amorphous and thus may show a glass transition. The glass transition temperature of the polyetheramine polyol does preferably not exceed 50° C., more preferably it does not exceed 30° C. and more preferably not exceed 10° C., determined by differential scanning calorimetry (DSC), as described below. The glass transition temperature of the polyetheramine polyol is preferably in the range of −55 to 30° C. and more preferably in the range of −55 to 10° C., determined by DSC.

Branched polyetheramine polyols and their preparation are known, for example from DE 3206459, EP 441198, WO 2009/047269, WO 2014/012812, which discloses branched polyetheramine polyols based on a polycondensation product of at least one trialkanolamine.

In one embodiment of the present invention, the branched polyetheramine polyol is obtainable by polycondensation of at least one trialkanolamine or by polycondensation of a mixture of at least one trialkanolamine with an aliphatic or cycloaliphatic polyol. For this purpose, trialkanolamines are preferably selected from tri-$C_2$-$C_8$-alkanol amines, wherein the alkanol groups in trialkanolamine may be different or identical, wherein the alkanol groups are preferably identical. More preferably, the trialkanolamines are selected from tri-$C_2$-$C_4$-alkanol amines, wherein the alkanol groups are identical. Particularly preferred trialkanolamines are triethanolamine, tri-n-propanolamine, triisopropanolamine, tri-n-butanolamine, and triisobutanolamine and mixtures thereof.

Suitable aliphatic or cycloaliphatic polyols are for example aliphatic diols, aliphatic polyols bearing more than 2 hydroxyl groups, cycloaliphatic diols, and cycloaliphatic polyols having more than 2 hydroxyl groups. Preferred are aliphatic diols and aliphatic polyols bearing more than 2 hydroxyl groups. Examples of aliphatic diols are $C_2$-$C_{20}$-diols, such as ethandiol, propandiol, butandiol, pentandiol, hexandiol, heptandiol, octandiol, and their structural isomers. Further examples of aliphatic diols are polyether diols of the general formula HO—$((CH_2)_n$—$O)_m$—H with n being independently from each other 1 to 10, preferably 2 to 4 and m being in the range of 2 to 100. Preferably, the polyether diols are selected from polyethylene glycol, polypropylene glycol, polytetramethylene glycol, and copolymers thereof. Examples of polyols having more than 2 hydroxyl groups are glycerol, pentaerythritol, trimethylolpropane, sorbitol, and the like. The polyols may also be alkoxylated, in particular ethoxylated or propoxylated, e.g. ethoxylated glycerol, propoxylated glycerol, ethylated pentaerythritol, propoxylated pentaerythritol, ethoxylated trimethylolpropane, propoxylated trimethylolpropane, ethoxylated sorbitol and propoxylated sorbitol. Usually the degree of alkoxylation, i.e. the number average of alkyleneoxide moieties, will not exceed 100 and is frequently in the range from 2 to 50.

Preferably, the polyetheramine polyol is obtainable by polycondensation, wherein monomers contain to at least 50% by weight, preferably at least 70% by weight, more preferably at least 80% by weight, based on the total amount of monomer, of compounds selected from trialkanolamines.

The polyetheramine polyol is preferably obtainable by polycondensation of monomers containing 50 to 100 mol-% of compounds selected from trialkanolamines and 0 to 50 mol-% of compounds selected from aliphatic or cycloaliphatic polyols, preferably containing 70 to 100 mol-% of compounds selected from trialkanolamines and 0 to 30 mol-% of compounds selected from aliphatic or cycloaliphatic polyols, more preferably containing 80 to 100 mol-% of compounds selected from trialkanolamines and 0 to 20 mol-% of compounds selected from aliphatic or cycloaliphatic polyols, whereby "mol-%" are based on the total amount of monomers.

In a particular embodiment, the polyetheramine polyol is obtainable by polycondensation, wherein monomers consist only of monomers selected from trialkanolamines. The trialkanolamine is preferably selected from tri-$C_2$-$C_4$-alkanolamines. Preferred tri-$C_2$-$C_4$-alkanolamines are selected from triethanolamine, triisopropanolamine, and tri-n-propanolamine.

The mixture of at least one trialkanolamine with an aliphatic or cycloaliphatic polyol is preferably selected form mixtures of at least one trialkanolamine, which is selected from the group consisting of tri-$C_2$-$C_4$-alkanolamines, and an aliphatic or cycloaliphatic $C_2$-$C_8$-polyol.

Particular preference is given to polyetheramine polyols obtainable by polycondensation of either triethanolamine, or of triisopropanolamine, or of a mixture of triethanolamine and triisopropanolamine. In this embodiment, optionally at least one further polyol, in particular at least one further diol might be present.

The polycondensation can be carried out with or without the presence of a catalyst. Suitable catalysts include but are not limited to phosphoric acid ($H_3PO_4$), phosphorous acid ($H_3PO_3$) or hypophosphoric acid ($H_3PO_2$), which can be applied in bulk or as aqueous solution. Preferably, the catalyst is added in an amount of from 0.001 to 10 mol-%, preferably from 0.005 to 7 mol-%, more preferably from 0.01 to 5 mol-%, based on the amount of the trialkanolamine.

The polycondensation can be carried out by using a solvent. Examples of solvents that can be used to perform the inventive process are aromatic and/or (cyclo)aliphatic hydrocarbons and their mixtures, halogenated hydrocarbons, ketones, esters, and ethers. Preference is given to aromatic hydrocarbons, (cyclo)aliphatic hydrocarbons, alkyl esters of alkanoic acids, ketones, alkoxylated alkyl esters of alkanoic acids, and mixtures thereof. Particularly preferred are monoalkylated or polyalkylated benzenes and naphthalenes, ketones, alkyl esters of alkanoic acids, and alkoxylated alkyl esters of alkanoic acids and mixtures thereof. The polycondensation is preferably carried out without using a solvent.

The polycondensation can be carried out in a way that the temperature during polycondensation does not exceed 250° C. and preferably not exceed 230° C. For example, the polycondensation is carried out at temperatures in the range of from 150 to 230° C., preferably 180 to 215° C. Even more preferably, the temperature during polycondensation does not exceed 215° C. and especially not exceed 210° C.

The polycondensation can be carried out at a pressure in the range of from 0.02 to 20 bar. Preferably, the polycondensation is carried out at Normal Pressure. The polycondensation is preferably followed by removal or blow-off of residual monomers, for example by distilling them off at Normal Pressure or at reduced pressure, for example, in the range of from 0.1 to 0.5 bar.

Water or other volatile products that are released during the polycondensation can be removed from the reaction mixture in order to accelerate the reaction. Preferably, water or other volatile products that are released during the polycondensation are removed, such removal being accomplished by distillation, for example, and optionally under reduced pressure. The removal of water or of other low molecular mass reaction by-products can also be assisted by passing through the reaction mixture a stream of gas which is substantially inert under the reaction conditions (stripping), such as nitrogen, for example, or a noble gas such as helium, neon, or argon, for example.

The branched polyetheramine polyols described herein are typically stable at room temperature for a prolonged period, such as for at least 10 weeks, for example. In particular, the polyetheramine polyols are stable without exhibiting instances of clouding, precipitation, and/or significant increase in viscosity.

The polycondensation can be terminated by a variety of options. For example, the temperature can be lowered to a range in which the reaction comes to a standstill and the polycondensation product is storage-stable. This is generally the case below 100° C., preferably below 60° C., more preferably below 40° C., and very preferably at room temperature. Another option is to deactivate the catalyst by adding a basic component, a Lewis base or an organic or inorganic base, for example.

The polycondensation can be carried out in stirred tank reactors or stirred tank reactor cascades. The process can be carried out batch-wise, in semi-batch mode or continuously.

Polycondensation products of trialkanolamines and poly-co-condensation products of trialkanolamines as described herein are preferably used as polyetheramine polyol without chemical modification or derivatization. However, a derivative of a polycondensation product of trialkanolamines or a derivative of a poly-co-condensation product of a trialkanolamine can be used instead of a non-derivatized polycondensation product.

Derivatives of such polycondensation and poly-co-condensation products of trialkanolamines include products obtained by alkoxylation of the hydroxyl end groups of the non-derivatized polycondensation and poly-co-condensation products. Likewise, it is possible to modify the non-derivatized polycondensation or poly-co-condensation products by hydrophobic groups or hydrophilic groups. Hydrophobization or hydrophilization can be achieved by reacting a part of the hydroxylic end groups with selected reactants. The amino groups of the polycondensation and poly-co-condensation products can also be quaternized to obtain permanently cationic modified polymers by use of alkylating agents. Derivatives of such polycondensation and poly-co-condensation products of trialkanolamines are described for example in US 2011/0168045, WO 2009/060060 and WO 2009/1112379 to which reference is made. For the purpose of the invention, preferred derivatized products are alkoxylated polycondensation and poly-co-condensation products.

The polyetheramine polyol usually dissolves readily in a variety of solvents, such as water, alcohols, such as methanol, ethanol, n-butanol, alcohol/water mixtures, acetone, 2 butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

The aqueous binder composition usually contains the branched polyetheramine polyol in the composition in an amount from 0.01 to 10% by weight, in particular from 0.05 to 7.5% by weight, more particular from 0.1 to 5% by weight based on the dry weight of the carboxylated polymer of the aqueous polymer latex.

The aqueous binder composition of the invention also contains an aqueous polymer latex of a film forming carboxylated polymer.

The term "film forming" in the context of the polymer latex means the ability of the carboxylated polymer of the polymer latex to form a film on surfaces upon drying under application conditions. The polymer will frequently have a film forming temperature of at most 50° C., in particular at most 30° C. The film forming temperature may be lowered, for example by addition of film forming aids, such as plasticizers and solvents.

The capability of the polymer of the latex to be film forming under application conditions will depend on its glass transition temperature. In general, the carboxylated polymer of the aqueous polymer dispersions has a glass transition temperature $T_g$ in the range from −20 to +60° C., in particular from 0 to +50° C., especially in the range from +5 to +40° C.

The glass transition temperature can be determined by the DSC method (differential scanning calorimetry, 20 K/min, midpoint measurement) in accordance to DIN 53765:1994-03 or ISO 11357-2, with sample preparation preferably to DIN EN ISO 16805:2005.

In case of a multi-phase polymer containing 2 or more polymers or polymer phases, respectively, with different glass transition temperatures, the glass transition temperatures of the individual polymer phases may be outside the ranges given here. However, the weight average glass transition temperature $T_g(av)$ as calculated by the equation $$T_g(av)=(T_g(1)*w_1+T_g(2)*w_2 \ldots T_g(n)*w_n)$$

is frequently in the range from −20 to +60° C., in particular form 0 to +50° C., especially in the range from +5 to +40° C. In the equation $T_g(1)$, $T_g(2)$ to $T_g(n)$ indicate the individual glass transition temperatures in K of the individual polymers 1, 2 to n while $w_1$, $w_2$ to $w_n$ indicate the amount in % by weight of the individual polymers 1, 2 to n. For example an aqueous latex of a multistage polymer containing 20% by weight of a first polymer phase 1 having a $T_g$ of −10° C. and 80% by weight of a second polymer phase having a $T_g$ of +40° C. have a weight average $T_g(av)=34°$ C. If the polymer of the aqueous polymer dispersions contains polymers having a different $T_g$'s, the difference between the lowest $T_g$ and the highest $T_g$ may be as high as e.g. 100° C., e.g. from 10 to 100° C. Preferably, the polymer dispersed in the aqueous polymer dispersion has only one $T_g$, or, if it contains polymers having different $T_g$'s the maximum difference of the lowest $T_g$ and the highest $T_g$ does not exceed 50 K, in particular 20 K.

According to Fox (T. G. Fox, Bull. Am. Phys. Soc. 1956, vol. 1, page 123) and according to Ullmann's Encyclopädie der technischen Chemie [Ullmann's Encyclopedia of Industrial Chemistry] (vol. 19, page 18, 4th edition, Verlag Chemie, Weinheim, 1980), the following is a good approximation of the glass transition temperature of no more than lightly crosslinked copolymers:

$$1/Tg(\text{Fox}) = x_1/Tg_1 + x_2/Tg_2 + \ldots x_n/Tg_n,$$

where $x_1, x_2, \ldots x_n$ are the mass fractions of the monomers 1, 2, ..., n and $Tg_1, Tg_2, \ldots, Tg_n$ are the glass transition temperatures in degrees Kelvin of the polymers synthesized from only one of the monomers 1, 2, ..., n at a time. The Tg values for the homopolymers of most monomers are known and listed, for example, in Ullmann's Encyclopedia of Industrial Chemistry, 5th ed., vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, and 3rd Ed. J. Wiley, New York 1989.

In case of a multi-stage polymer containing 2 polymers or polymer phases having different glass transition temperatures, the glass transition temperature of the one phase is usually above 40° C., preferably at least 60° C., determined via DSC as described herein. The glass transition temperature of the other phase, according to Fox, is usually below 40° C., preferably at most 30° C., determined via DSC as described herein.

In case of a multi-stage polymer containing 2 polymers or polymer phases having different glass transition temperatures, the polymer preferably contains 95 to 40% by weight, based on the total weight of the polymer, of the polymer with the lower glass transition temperature, which is usually below 40° C., and 5 to 60% by weight, based on the total weight of the polymer, of the polymer with the higher glass transition temperature, which is usually above 40° C.

The term "carboxylated polymer" means that the polymer of the latex bears carboxyl groups attached to the polymer backbone. Usually, the carboxyl groups are incorporated into the polymer by means of polymerized ethylenically unsaturated monomers having one or more carboxyl group. Such monomers are typically selected from monoethylenically unsaturated monocarboxylic acids having 3 to 6 carbon atoms and monoethylenically unsaturated dicarboxylic acids having 4 to 6 carbon atoms. Examples of such monomers are acrylic acid, methacrylic acid, crotonic acid, 2-ethylpropenoic acid, 2-propylpropenoic acid, itaconic acid, and fumaric acid.

The carboxylated polymer of the film forming polymer latex is usually obtainable by a radical copolymerization of a monomers M forming the carboxylated monomer latex. These monomers M, which are also termed monomer composition M, comprise at least one monoethylenically unsaturated monomer having at least one carboxyl group, which is, for example, selected from monoethylenically unsaturated monocarboxylic acids having 3 to 6 carbon atoms and monoethylenically unsaturated dicarboxylic acids having 4 to 6 carbon atoms, and at least one further neutral ethylenically unsaturated monomer, which is essentially water insoluble, i.e. which has a solubility in deionized water of at most 50 g/l at 20° C. Usually, said monomer composition comprises from 0.05 to 10% by weight, based on the total weight of the monomers contained in the monomer composition, of one or more monoethylenically unsaturated monomer having at least one carboxyl group.

In particular, the monomer composition M essentially consists of a) one or more ethylenically unsaturated monomers M1, which have a solubility in deionized water of at most 50 g/l at 20° C. and which are in particular selected $C_1$-$C_{20}$-alkyl esters of monoethylenically unsaturated monocarboxylic acids having 3 to 6 carbon atoms, di-$C_1$-$C_{20}$-alkyl esters of monoethylenically unsaturated dicarboxylic acids having 4 to 6 carbon atoms, $C_5$-$C_{20}$-cycloalkyl esters of monoethylenically unsaturated monocarboxylic acids having 3 to 6 carbon atoms, vinylesters of $C_1$-$C_{20}$-alkanoic acids, vinyl aromatic monomers, $C_2$-$C_6$-monoolefines and butadiene;

b) one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms;

c) optionally one or more non-ionic monomers M3, which are different from monomers M1.

In this context, the term "essentially consists of" means that the total amount of monomers M1, M2 and M3 makes up at least 95% by weight, in particular at least 99% by weight or 100% by weight of the total amount of monomers of the monomer composition.

Examples of monomers M1 include, but are not limited to $C_1$-$C_{20}$-alkyl esters of monoethylenically unsaturated monocarboxylic acids having 3 to 6 carbon atoms, such as $C_1$-$C_{20}$-alkyl esters of acrylic acid, such as methyl acrylate, ethyl acrylate, n-propyl acrylate, isopropylacrylate, n-butyl acrylate, 2-butyl acrylate, isobutyl acrylate, n-pentyl acrylate, n-hexyl acrylate, n-octyl acrylate, 2-ethylhexyl acrylate, n-decyl acrylate, 2-propylheptyl acrylate, lauryl acrylate, $C_{12}/C_{14}$-alkyl acrylate, and stearyl acrylate, $C_1$-$C_{20}$-alkylesters of methacrylic acid, such as methyl methacrylate, ethyl methacrylate, n-propyl methacrylate, isopropyl methacrylate, n-butyl methacrylate, 2-butyl methacrylate, isobutyl methacrylate, tert.-butyl methacrylate, n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}/C_{14}$-alkyl methacrylate, and stearyl methacrylate;

di-$C_1$-$C_{20}$-alkyl esters of monoethylenically unsaturated dicarboxylic acids having 4 to 6 carbon atoms, such as di-$C_1$-$C_{20}$-alkyl esters of itaconic acid, di-$C_1$-$C_{20}$-alkyl esters of citraconic acid, di-$C_1$-$C_{20}$-alkyl esters of maleic acid and di-$C_1$-$C_{20}$-alkyl esters of fumaric acid, $C_5$-$C_{20}$-cycloalkyl esters of monoethylenically unsaturated monocarboxylic acids having 3 to 6 carbon atoms, $C_5$-$C_{20}$-cycloalkyl esters of acrylic acid and $C_5$-$C_{20}$-cycloalkyl esters of methacrylic acid, vinylesters of $C_1$-$C_{20}$-alkanoic acids, vinyl aromatic monomers such as mono-vinyl substituted aromatic hydrocarbons such as styrene, 2-methylstyrene, 4-methylstyrene, 2-n-butylstyrene, 4-n-butylstyrene, 4-n-decylstyrene and alpha-methylstyrene, $C_2$-$C_6$-monoolefines and butadiene.

In a preferred embodiment, the monomers M1 are a mixture of at least one monomer M1a, selected from $C_1$-$C_{20}$-alkyl esters of acrylic acid and $C_5$-$C_{20}$-alkylesters of methacrylic acid; and at least one monomer M1b, selected from vinyl aromatic monomers, and $C_1$-$C_4$-alkyl esters of methacrylic acid and mixtures thereof.

Suitable monomers M1a are $C_1$-$C_{20}$-alkyl esters of acrylic acid, such as methyl acrylate, ethyl acrylate, n-propyl acrylate, isopropyl-acrylate, n-butyl acrylate, 2-butyl acrylate, isobutyl acrylate, n-pentyl acrylate, n-hexyl acrylate, n-octyl acrylate, 2-ethylhexyl acrylate, n-decyl acrylate, 2-propylheptyl acrylate, lauryl acrylate, $C_{12}/C_{14}$-alkyl acrylate, and stearyl acrylate;

$C_5$-$C_{20}$-alkylesters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}/C_{14}$-alkyl methacrylate, and stearyl methacrylate;

and mixtures thereof.

Suitable monomers M1b are $C_1$-$C_4$-alkyl esters of methacrylic acid, such as methyl methacrylate, ethyl methacrylate, n-propyl methacrylate, isopropyl methacrylate, n-butyl methacrylate, 2-butyl methacrylate, isobutyl methacrylate and tert.-butyl methacrylate, with particular preference given to methyl methacrylate;

vinyl aromatic monomers, in particular mono-vinyl substituted aromatic hydrocarbons such as styrene, 2-methylstyrene, 4-methylstyrene, 2-n-butylstyrene, 4-n-butylstyrene, 4-n-decylstyrene and alpha-methylstyrene, with particular preference given to styrene;

and mixtures thereof.

Preferably, monomers M1a are selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, and 2-propylheptyl acrylate.

Preferably, monomers M1b are selected from vinyl aromatic monomers and $C_1$-$C_4$-alkyl esters of methacrylic acid and mixtures thereof, in particular from styrene, methyl methacrylate.

In the mixtures of monomers M1a and M1b, the relative amount of M1a and M1b may vary in particular from 10:1 to 1:10, more particularly from 5:1 to 1:5, especially from 3:1 to 1:3.

Examples of monomers M2 include, but are not limited to acrylic acid, methacrylic acid, crotonic acid, 2-ethylpropenoic acid, 2-propylpropenoic acid, itaconic acid and fumaric acid. Preference is given to monocarboxylic acids. Particular preference is given to acrylic acid, methacrylic acid, and mixtures thereof.

Especially preferred, the monomer M2 is selected from methacrylic acid or a mixture of acrylic acid and methacrylic acid.

Examples of monomers M3 include, but are not limited to primary amides of monoethylenically unsaturated monocarboxylic acids having 3 to 8 carbon atoms (monomers M3.1), such as acrylamide and methacrylamide;

N—$C_1$-$C_{10}$ alkyl amides of monoethylenically unsaturated monocarboxylic acids having 3 to 6 carbon atoms (monomers M3.2), in particular N—$C_1$-$C_{10}$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide;

monoethylenically unsaturated monomers bearing urea or keto groups (Monomers M3.3), such as 2-(2-oxo-imidazolidin-1-yl) ethyl (meth)acrylate, 2-ureido (meth)acrylate, N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM) and diacetonemethacrylamide;

hydroxyalkyl esters of monoethylenically unsaturated $C_3$-$C_6$ monocarboxylic acids (monomers M3.4), especially hydroxyalkyl esters of acrylic acid and hydroxyalkyl esters of methacrylic acid, also referred to hereinafter as hydroxyalkyl (meth)acrylates, in particular hydroxy-$C_2$-$C_4$-alkylesters of acrylic acid and hydroxy-$C_2$-$C_4$-alkylesters of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, etc.

monoethylenically unsaturated monomers which bear at least one tri-$C_1$-$C_4$-alkoxysilane group (monomers M3.5), such as vinyl trimethoxysilane, vinyl triethoxysilane, methacryloxyethyl trimethoxysilane, methacryloxyethyl triethoxysilane, and mixtures thereof. The amount of said monomers M3.5 will frequently be in the range from 0.01 to 1 pphm.

Monomers M3 may also include a small amount of multiethylenically unsaturated monomers (monomers M3.6), i.e. monomers having at least 2 non-conjugated ethylenically unsaturated double bounds. The amounts of said monomers M3.6 will generally not exceed 1 pphm. Examples of suitable monomers M3.6 include:

Diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol) or 1,2-cyclohexanediol;

monoesters of monoethylenically unsaturated C3-C6 monocarboxylic acids with monoethylenically unsaturated aliphatic or cycloaliphatic monohydroxy compounds, such as the acrylates and the methacrylates of vinyl alcohol (ethenol), allyl alcohol (2 propen-1-ol), 2-cyclohexen-1-ol or norbornenol and divinyl aromatic compounds, such as 1,3-divinyl benzene, 1,4-divinyl benzene and mixtures thereof.

In a particular embodiment of the invention, the monomers M do not contain monomers M3.6 or not more than 0.1 pphm of monomers M3.6.

Amongst monomers M3, preference is given to hydroxyalkyl esters of acrylic acid and hydroxyalkyl esters of methacrylic acid, in particular to hydroxy-$C_2$-$C_4$-alkylesters of acrylic acid and hydroxy-$C_2$-$C_4$-alkylesters of methacrylic acid, acrylamide, methacrylamide, and to mixtures thereof.

The carboxylated polymer is preferably obtainable by polymerization of a monomer composition M, where the monomer composition M essentially consists of a) 70 to 99.95% by weight, in particular from 80 to 99.9% by weight, especially from 90 to 99.8% by weight, based on the total weight of the monomers of the monomer composition M, of one or more monoethylenically unsaturated monomers M1 as defined herein, b) 0.05 to 10 by weight, in particular from 0.1 to 8% by weight, especially from 0.2 to 5% by weight, based on the total weight of the monomers of the monomer composition M, of one or more monoethylenically unsaturated monomers M2 as defined herein, c) 0 to 20% by weight, in particular from 0 to 10% by weight, especially from 0 to 5% by weight, based on the total weight of the monomers of the monomer composition M, of one or more non-ionic monomers M3 as defined herein, which are different from monomers M1.

The carboxylated polymer is in particular obtainable by a polymerization of a monomer composition M, where the monomer composition M consists of a) one or more ethylenically unsaturated monomers M1, which are selected from the group consisting of
   at least one monomer M1a, selected from $C_1$-$C_{20}$-alkyl esters of acrylic acid and $C_5$-$C_{20}$-alkylesters of methacrylic acid; and
   at least one monomer M1b, selected from vinyl aromatic monomers, and $C_1$-$C_4$-alkyl esters of methacrylic acid and mixtures thereof, b) one or more monoethylenically unsaturated monomers M2, which are selected from the group consisting of monoethylenically unsaturated monocarboxylic acids having 3 to 6 carbon atoms and monoethylenically unsaturated dicarboxylic acids having 4 to 6 carbon atoms;

c) optionally one or more non-ionic monomers M3, which are different from monomers M1.

In a preferred embodiment, the film forming carboxylated polymer is obtainable by a polymerization of a monomer composition M, where the monomer composition M essentially consists of a) 70 to 99.95% by weight, in particular from 80 to 99.9% by weight, especially from 90 to 99.8% by weight, based on the total weight of the monomers of the monomer composition M, of one or more monoethylenically unsaturated monomers M1, which are selected from the group consisting of
   at least one monomer M1a, selected from $C_1$-$C_{20}$-alkyl esters of acrylic acid and $C_5$-$C_{20}$-alkylesters of methacrylic acid; and
   at least one monomer M1b, selected from vinyl aromatic monomers, and $C_1$-$C_4$-alkyl esters of methacrylic acid and mixtures thereof b) 0.05 to 10% by weight, in particular from 0.1 to 8% by weight, especially from 0.2 to 5% by weight, based on the total weight of the monomers of the monomer composition M, of one or more monoethylenically unsaturated monomers M2 as defined herein, c) 0 to 20% by weight, in particular from 0 to 10% by weight, especially from 0 to 5% by weight, based on the total weight of the monomers of the monomer composition M, of one or more non-ionic monomers M3 as defined herein, which are different from monomers M1.

In the aqueous carboxylated polymer latex, the dispersed polymers are in the form of polymer particles. The polymer particles typically have an average diameter in the range from 50 to 500 nm, in particular in the range from 60 to 400 nm and especially in the range from 80 to 300 nm. The average particle diameter as referred herein relates to the Z average particle diameter as determined by means of photon correlation spectroscopy (PCS), also known as quasielastic light scattering (QELS) or dynamic light scattering (DLS). The measurement method is described in the ISO 13321: 1996 standard. The determination can be carried out using an HPPS (High Performance Particle Sizer). For this purpose, a sample of the aqueous polymer latex will be diluted and the dilution will be analysed. In the context of DLS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa·s. The measurement gives an average value of the second order cumulant analysis (mean of fits), i.e. Z average. The "mean of fits" is an average, intensity-weighted hydrodynamic particle diameter in nm.

Preferably, the polymers in the polymer dispersion have a narrow particle size distribution. The particle size distribution is characterized by the polydispersity index, which is a dimensionless number calculated from a simple 2 parameter fit to the correlation data of the cumulant analysis. The calculation is normally done as described in ISO 13321: 1996. Frequently, the PDI will be less than 0.2.

The polymer latex of the carboxylated polymer is usually obtainable by an aqueous radical emulsion polymerization, in particular by free-radical aqueous emulsion polymerization, of the monomers M forming the carboxylated monomer latex by analogy to well-known processes of radical emulsion polymerisation technology. The conditions required for the performance of the radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969)].

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AlBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 to 5 pphm, preferably 0.1 to 3 pphm.

The amount of free-radical initiator required in the process of the invention for the emulsion polymerization M can be initially charged in the polymerization vessel completely. However, it is also possible to charge none of or merely a portion of the free-radical initiator, for example not more than 30% by weight, especially not more than 20% by weight, based on the total amount of the free-radical initiator required in the aqueous polymerization medium and then, under polymerization conditions, during the free-radical emulsion polymerization of the monomers M to add the entire amount or any remaining residual amount, according to the consumption, batchwise in one or more portions or continuously with constant or varying flow rates.

Preferably, the radical emulsion polymerization of the monomers forming the carboxylated polymer latex is performed by a so-called feed process, which means that at least 90%, in particular at least 95% or the total amount of the monomers to be polymerised are metered to the polymerisation reaction under polymerisation conditions during a metering period P. The duration of the period P may depend from the production equipment and may vary from e.g. 20 minutes to 12 h. Frequently, the duration of the period P will be in the range from 0.5 h to 5 h, especially from 1 h to 4 h.

The term "polymerization conditions" is generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

It may be suitable to establish the polymerization conditions and to initially charge at least a portion of the free-radical initiator into the polymerization vessel before the metering of the monomers M is started.

It has been found advantageous to perform the free-radical emulsion polymerization in the presence of seed latex. A seed latex is a polymer latex which is present in the aqueous polymerization medium before the metering of the monomers M is started.

The seed latex may help to better adjust the particle size or the final polymer latex obtained in the free-radical emulsion polymerization of the invention.

Principally every polymer latex may serve as seed latex. For the purpose of the invention, preference is given to seed latices, where the particle size of the polymer particles is comparatively small. In particular, the Z average particle diameter of the polymer particles of the seed latex, as determined by dynamic light scattering at 20° C. (see below) is preferably in the range from 10 to 80 nm, in particular from 10 to 50 nm. Preferably, the polymer particles of the seed latex is made of ethylenically unsaturated monomers, which comprise at least 95% by weight, based on the total weight of the monomers forming the seed latex, of one or more monomers M1a and/or M1b as defined above. In the polymer particles of the seed latex particular comprise at least 95% by weight, based on the total weight of the monomers forming the seed latex, of at least one monomer M1b or of a mixture of at least one monomer M1b and one or more monomers M1a, where the proportion of monomers M1b to M1a is at least 50% on a weight basis.

For this, the seed latex is usually charged into the polymerisation vessel before the metering of the monomers M is started. In particular, the seed latex is charged into the polymerisation vessel followed by establishing the polymerization conditions, e.g. by heating the mixture to polymerization temperature. It may be beneficial to charge at least a portion of the free-radical initiator into the polymerisation vessel before the metering of the monomers M is started. However, it is also possible to meter the monomers and the free-radical polymerization initiator in parallel to the polymerization vessel.

The amount of seed latex, calculated as solids, may frequently be in the range from 0.1 to 10% by weight, in particular from 0.5 to 5% by weight, based on the total weight of the monomers M to be polymerized.

The free-radical aqueous emulsion polymerization of the invention can be conducted at temperatures in the range from 0 to 170° C. Temperatures employed are generally in the range from 50 to 120° C., frequently from 60 to 120° C. and often from 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at ambient pressure (about 1 atm) with exclusion of oxygen, for example under an inert gas atmosphere, for example under nitrogen or argon.

The polymerization of the monomers M can optionally be conducted in the presence of chain transfer agents. Chain transfer agents are understood to mean compounds that transfer free radicals and which reduce the molecular weight of the or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkylesters of mercaptoacetic acid (thioglycolic acid), such as 2-ethylhexyl thioglycolate, alkylesters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M, will generally not exceed 1% by weight. However, it is possible, that during a certain period of the polymerization reaction the amount of chain transfer agent added to the polymerization reaction may exceed the value of 1% by weight, based on the total amount of monomers already added to the polymerization reaction.

The free-radical emulsion polymerization of the invention is usually effected in an aqueous polymerization medium, which, as well as water, comprises at least one surface-active substance (surfactant) for stabilizing the emulsion of the monomers and the polymer particles of the polymer latex.

The surfactant may be selected from emulsifiers and protective colloids. Protective colloids, as opposed to emulsifiers, are understood to mean polymeric compounds having molecular weights above 2000 Daltons, whereas emulsifiers typically have lower molecular weights. The surfactants may be anionic or nonionic or mixtures of non-ionic and anionic surfactants.

Anionic surfactants usually bear at least one anionic group, which is selected from phosphate, phosphonate, sulfate, and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example,
the salts, especially the alkali metal and ammonium salts, of alkyl sulfates, especially of $C_8$-$C_{22}$-alkyl sulfates,
the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40),
the salts, especially the alkali metal and ammonium salts, of alkylsulfonic acids, especially of $C_8$-$C_{22}$-alkylsulfonic acids,
the salts, especially the alkali metal and ammonium salts, of dialkyl esters, especially di-$C_4$-$C_{18}$-alkyl esters of sulfosuccinic acid,
the salts, especially the alkali metal and ammonium salts, of alkylbenzenesulfonic acids, especially of $C_4$-$C_{22}$-alkylbenzenesulfonic acids, and
the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:
the salts, especially the alkali metal and ammonium salts, of alkyl sulfates, especially of $C_8$-$C_{22}$-alkyl sulfates,
the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
of sulfuric monoesters of ethoxylated alkylphenols, especially of sulfuric monoesters of ethoxylated $C_4$-$C_{18}$-alkylphenols (EO level preferably 3 to 40),
of alkylbenzenesulfonic acids, especially of $C_4$-$C_{22}$-alkylbenzenesulfonic acids, and
of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifiers, which bear a phosphate or phosphonate group, include, but are not limited to the following, salts selected from the following groups:
the salts, especially the alkali metal and ammonium salts, of mono- and dialkyl phosphates, especially $C_8$-$C_{22}$-alkyl phosphates,
the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20,
the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40),
the salts, especially the alkali metal and ammonium salts, of alkylphosphonic acids, especially $C_8$-$C_{22}$-alkylphosphonic acids and
the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

As well as the aforementioned anionic surfactants, the surfactant may also comprise one or more nonionic surface-active substances, which are especially selected from non-ionic emulsifiers. Suitable nonionic emulsifiers are e.g. araliphatic or aliphatic nonionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols, in particular to those where the alkyl radical $C_8$-$C_{30}$ having a mean ethoxylation level of 5 to 100 and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants used in the process of the present invention comprise less than 20% by weight, especially not more than 10% by weight, of nonionic surfactants, based on the total amount of surfactants used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range form 0.5:1 to 10:1, in particular from 1:1 to 5:1.

Preferably, the surfactant will be used in such an amount that the amount of surfactant is in the range from 0.2 to 5% by weight, especially in the range from 0.5 to 3% by weight, based on the monomers M to be polymerized.

The aqueous reaction medium in polymerization may in principle also comprise minor amounts (usually at most 5% by weight) of water-soluble organic solvents, for example methanol, ethanol, isopropanol, butanols, pentanols, but also acetone, etc. Preferably, however, the process of the invention is conducted in the absence of such solvents.

It is frequently advantageous when the aqueous polymer dispersion obtained on completion of polymerization of the monomers M is subjected to an after-treatment to reduce the residual monomer content. This after-treatment is effected either chemically, for example by completing the polymerization reaction using a more effective free-radical initiator system (known as postpolymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical after-treatment has the advantage that it removes not only the unconverted ethylenically unsaturated monomers but also other disruptive volatile organic constituents (VOCs) from the aqueous polymer dispersion.

The polymer latex of the carboxylated polymer is for example obtainable by a singlestage or by a multistage emulsion polymerization, in particular an aqueous radical emulsion polymerization, of a monomer composition M. The term "multistage" in the context of aqueous emulsion polymerization is well understood to mean that the relative concentration of the monomers in the monomer composition M added to the polymerization reaction is altered at least once during the aqueous emulsion polymerization. Such a procedure results in at least two polymer populations of different monomer compositions in the polymer particles of the latex. For example, it will be possible to change the monomer composition such that the multistage latex polymer features populations having different glass transition temperatures or a glass transition temperature ($T_g$) gradient. It may also be possible to change the monomer composition such that the multistage latex polymer features populations having different concentrations of polymerized acidic monomers, such as monomers M2 or a concentration gradient of monomers M2.

During the addition of the monomers M, the type of monomers and/or the relative amounts thereof can be altered continuously or stepwise. However, it is also possible that the type and relative amounts of monomers M, which are added to the polymerization reaction remains constant. For example, it is possible that the ratio of monomers M1 and M2 increases or decreases during the addition.

Preferably, the aqueous polymer latex of the carboxylated polymer is prepared by a radical aqueous emulsion polymerization by the so-called feed method, where during the feeding of the monomer composition M, where where at least 90% of the monomer composition M to be polymerised are metered to the polymerisation reaction under polymerisation conditions during a metering period P, and where the composition of the portion of the monomer composition M, which is metered to the polymerisation reaction under polymerisation conditions is changed at least once during the metering period P.

In a particular embodiment, the level of monomers M2 in the monomer composition M, i.e. the relative amount of monomers M2 to the weight of the monomer composition M, which is fed to the polymerization reaction, is increased to a higher level for one or more limited periods P(n) of time. After each of said periods, the relative amount of said monomers M2 will be decreased. During each of the periods P(n), the relative amount of monomers M2 to the total amount of monomers which are fed during that period is at least one 0.5 pphm higher, in particular at least 1.0 pphm higher than the level outside the periods. In particular, the level of monomers M2 fed during the periods P(n) is 0.5 to 80 pphm, especially 1.0 to 50 pphm higher than the average level of monomers M2, which is fed outside the periods P(n).

Here and throughout the specification and in particular in this embodiment, the term pphm (parts per hundred monomers) is used as a synonym for the relative amount of a certain monomer to the total amount of monomer composition M in % by weight. For example, x pphm monomer M2 means x % by weight of monomers M2, based on the total amount of monomers of the monomer composition M. An increase of y pphm means that the relative amount of a specific monomer is increased by y % by weight, based on the total weight of the monomers of the monomer composition M.

In this particular embodiment, there may be a single period P(n), during which the weight level of monomers M2 is increased. However, there may also be more than one period P(n). The total number of periods P(n) is not particularly limited and may be as high as 20 or even higher. For practical reasons the total number of periods P(n) will generally not exceed 10 and in particular be from 1 to 6.

In this particular embodiment, the level of monomers M2 in the monomer composition M, which is fed outside the periods P(n), i.e. the level of monomers M2 before and after each period P(n), may be the same or it may slightly vary. The variation in the level of monomers M2 outside the periods P(n) will normally be not more than 1 pphm, in particular not more than 0.5 pphm. The values given here refer to the average values during the periods P(n) and outside the periods P(n). Preferably, the level of monomers M2 within the periods P(n) will be in the range from 1.5 to 85 pphm, especially 2 to 50 pphm.

In this particular embodiment, the period(s) P(n), where the level of the acidic monomers M2 is increased, may be completely within said period P or at the end of the period P. In this particular embodiment, it is important that the first period P(n) does not start before at least 5% of the monomers M, in particular at least 10% of the monomers M, which are subjected to the emulsion polymerization, have been metered into the polymerization reaction.

During said period(s) P(n) the weight ratio of the acidic monomers M2 to the total amount of the other monomers M1+M3 in the monomer composition, which is metered into the polymerization reaction, is frequently at least 0.02:1, in particular at least 0.03:1. Before each such period P(n) the ratio of the acidic monomers M2 to the total amount of the other monomers M1+M3 should be less than 0.03:1 in particular less than 0.02:1. Likewise, at the end of each period P(n), the ratio of the acidic monomers M2 to the total amount of the other monomers M1+M3 should be decreased to be less than 0.03:1 in particular less than 0.02:1.

Preferably, the level of monomers M2 in the monomer composition and likewise the weight ratio of the acidic monomers M2 to the total amount of the other monomers M1+M3 in the monomer composition M, which is metered into the polymerization reaction, can be manipulated by well-known measures. For example, it may be possible to use a single feed line for metering the monomers M into the polymerization reaction. By increasing the concentration of the monomers M2 in the single feed line of monomers M or by lowering the total concentrations of monomers M1+M3 or by both measures the ratio of the acidic monomers M2 to the total amount of the other monomers M1+M3 can be increased. A portion of the monomers M2, e.g. at least 20%, in particular at least 30%, e.g. from 20 to 100% or from 30 to 100% of the monomers M2 contained in the monomer composition M, may be metered to the polymerization reaction via a separate feed line into the polymerization reaction.

It is apparent that the total duration of all periods P(n) is shorter than the duration of the period P required for the metering of the total amount of monomers M into the polymerization reaction. Frequently, the total duration of all periods P(n) does not exceed 50%, in particular 40% and especially 30% of the duration of period P. Frequently, the total duration of all periods P(n) is at least 0.2%, in particular at least 0.5% and especially at least 1% of the duration of period P. In particular, the ratio of the total duration of all periods P(n) to the duration of the period P is from 0.002:1 to 0.5:1, especially from 0.005:1 to 0.30:1. Frequently, the total duration of all periods P(n) is from 30 seconds to 60 minutes. The duration of an individual period P(n) is of minor importance may be some seconds, e.g. 10 seconds and be up to 60 minutes or higher. The duration of a period P may depend from the production equipment and may vary from e.g. 20 minutes to 12 h. Frequently, it will be in the range from 0.5 h to 5 h, especially from 1 h to 4 h.

In this particular embodiment, it is possible to add the total amount of monomers M2 contained in the monomer composition M during the at least one period P(n)), i.e. during all of the periods P(n), to the polymerization reaction. However, it is not necessary to add the total amount of monomers M2 during the at least one period P(n). Rather, it is preferred that outside the periods P(n) the monomer composition metered to the polymerization reaction also comprise one or more monomers M2. Frequently, at least 20% of the monomers M2 contained in the monomer composition M, in particular at least 30% of the monomers M2 contained in the monomer composition M are metered into the polymerization reaction during the at least one period P(n).

The concentration of the polymer latex contained in the aqueous binder composition is frequently in the range from 10 to 70% by weight, in particular in the range from 30 to 65% by weight, especially in the range of 40 to 65% by weight, based in on the total weight of the binder composition.

The aqueous binder composition usually consists of the aqueous polymer latex of a film forming carboxylated polymer as described herein and the branched polyetheramine polyol as described herein and water. However, the aqueous binder composition optionally contains further components such as for example dispersants, biocides, and defoamers.

The present invention also relates to water-borne coating compositions containing the aqueous binder composition as defined herein.

Preferred embodiments of the aqueous binder composition contained in the water-borne coating compositions are those mentioned hereinabove.

In addition to the binder composition, the coating compositions preferably further contain at least one pigment and/or at least one filler. However, coating compositions, which do not contain a pigment or filler are also part of the invention.

Pigments for the purposes of the present invention are virtually insoluble, finely dispersed, organic or preferably inorganic colorants as per the definition in German standard specification DIN 55944. Preferably, the composition contains at least one inorganic pigment. Representative examples of organic pigments are monoazo pigments, such as C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;

diazo pigments, such as C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;

anthanthrone pigments, such as C.I. Pigment Red 168 (C.I. Vat Orange 3);

anthraquinone pigments, such as C.I. Pigment Yellow 147 and 177; C.I. Pigment Violet 31;

anthraquinone pigments, such as C.I. Pigment Yellow 147 and 177; C.I. Pigment Violet 31;

anthrapyrimidine pigments, such as C.I. Pigment Yellow 108 (C.I. Vat Yellow 20);

quinacridone pigments, such as C.I. Pigment Red 122, 202 and 206; C.I. Pigment Violet 19;

quinophthalone pigments, such as C.I. Pigment Yellow 138;

dioxazine pigments, such as C.I. Pigment Violet 23 and 37;

flavanthrone pigments, such as C.I. Pigment Yellow 24 (C.I. Vat Yellow 1);

indanthrone pigments, such as C.I. Pigment Blue 60 (C.I. Vat Blue 4) and 64 (C.I. Vat Blue 6);

isoindoline pigments, such as C.I. Pigment Orange 69; C.I. Pigment Red 260; C.I. Pigment Yellow 139 and 185;

isoindolinone pigments, such as C.I. Pigment Orange 61; C.I. Pigment Red 257 and 260; C.I. Pigment Yellow 109, 110, 173 and 185;

isoviolanthrone pigments, such as C.I. Pigment Violet 31 (C.I. Vat Violet 1);

metal complex pigments, such as C.I. Pigment Yellow 117, 150 and 153; C.I. Pigment Green 8;

perinone pigments, such as C.I. Pigment Orange 43 (C.I. Vat Orange 7); C.I. Pigment Red 194 (C.I. Vat Red 15);

perylene pigments, such as C.I. Pigment Black 31 and 32; C.I. Pigment Red 123, 149, 178, 179 (C.I. Vat Red 23), 190 (C.I. Vat Red 29) and 224; C.I. Pigment Violet 29;

phthalocyanine pigments, such as C.I. Pigment Blue 15, 15:1, 15:2, 15:3, 15:4, 15:6 and 16; C.I. Pigment Green 7 and 36;

pyranthrone pigments, such as C.I. Pigment Orange 51; C.I. Pigment Red 216 (C.I. Vat Orange 4);

thioindigo pigments, such as C.I. Pigment Red 88 and 181 (C.I. Vat Red 1); C.I. Pigment Violet 38 (C.I. Vat Violet 3);

triarylcarbonium pigments, such as C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black);

C.I. Pigment Yellow 101 (aldazine yellow), and C.I. Pigment Brown 22.

Specific examples of preferred organic pigments are C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43, and C.I. Pigment Green 7.

Preferred are inorganic pigments, for example white pigments such as titanium dioxide (C.I. Pigment White 6), zinc white, pigment grade zinc oxide; zinc sulfide, lithopone; lead white; furthermore white fillers such as barium sulfate and $CaCO_3$ which are also referred to as inorganic white pigments in the context of the present invention, black pigments, such as iron oxide black (C.I. Pigment Black 11), iron manganese black, spinel black (C.I. Pigment Black 27), carbon black (C.I. Pigment Black 7);

color pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 und 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate red (C.I. Pigment Red 104); ultramarine read, iron oxide brown, mixed brown, spinel- and Korundum phases (C.I. Pigment Brown 24, 29 und 31), chrome orange;

iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184);

Interference pigments, such as metallic effect pigments based on coated metal platelets, pearl luster pigments based on mica platelets coated with metal oxide, and liquid crystal pigments.

Preferred inorganic pigments are selected from inorganic yellow pigments and inorganic white pigments, especially titanium dioxide, barium sulfate, and CaCO3.

The compositions can also comprise mixtures of two or more different pigments, in which case it is preferable that at least one pigment be inorganic. The pigments are usually in particulate form, i.e., in the form of particles. Pigments can be selected from crude pigments, i.e., untreated as-synthesized pigments. The particles of pigment may be regular or irregular in shape in that, for example, the particles may have a spherical or substantially spherical shape or a needle (acicular) shape.

In one embodiment of the present invention, the pigment is in spherical or substantially spherical shape, i.e., the ratio of the longest diameter to the smallest diameter is in the range from 1.0 to 2.0, preferably up to 1.5.

In one embodiment of the present invention, the pigment has an average particle diameter (median, d50) in the range of from 20 to 50 µm, preferably in the range from 50 to 20 µm and more preferably to a maximum of 5 µm, measured, e.g., by Coulter counter or with a Hegman gauge.

Examples of suitable fillers are aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers, or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The proportion of the pigments and fillers in coating compositions can be described in a manner known per se via the pigment volume concentration (PVC). The PVC describes the ratio of the volume of pigments (VP) and fillers (VF) relative to the total volume, consisting of the volumes of binder (VB), pigments (VP) and fillers (VF) in a dried coating film in percent: PVC=(VP+VF)×100/(VP+VF+VB).

The compositions usually have a pigment volume concentration (PVC) of at least 5, especially at least 10. Preferably, the PVC will not exceed a value of 60, especially 40, and is specifically in the range from 5 to 60 or 5 to 40. However, the inventive effects of the polymer dispersions are also manifested in varnishes which typically have a pigment/filler content below 5% by weight, based on the varnish, and correspondingly have a PVC below 5.

The aqueous coating compositions of the invention may also comprise customary auxiliaries. The customary auxiliaries will depend from the kind of the coating in a well-known manner and include but are not limited to:
rheology modifying agents,
wetting agents or dispersants,
filming auxiliaries,
leveling agents,
biocides, and
defoamers.

Suitable rheology modifying agents include associative thickener polymers and non-associative rheology modifiers. Suitable associative thickener polymers include anionic associate thickeners such as hydrophobically modified acrylate thickeners, also termed HASE thickeners, and nonionic associative thickeners, also termed NiSAT type associative thickeners, including the hydrophobically modified polyethylene oxide urethane rheology modifiers, also termed HEUR or PUR thickeners, and hydrophobically modified polyethyleneoxides, which are also termed HMPE. Suitable non-associative rheology modifiers are in particular cellulose based thickeners, especially hydroxyethyl cellulose, but also thickeners based on acrylate emulsions (ASE). Preference is given to non-associative cellulose based thickeners. The amount of the thickener polymer will depend on the desired viscosity profile and is frequently in the range from 0.05 to 2.5% by weight, in particular 0.1 to 2% by weight of thickener, and especially 0.15 to 1.5% by weight, based on the latex paint.

Suitable wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are solvents and plasticizers. Plasticizers, in contrast to solvents, have a low volatility and preferably have a boiling point at 1013 mbar of higher than 250° C. while solvents have a higher volatility than plasticizers and preferably have a boiling point at 1013 mbar of less than 250° C. Suitable filming auxiliaries are, for example, white spirit, pine oil, propylene glycol, ethylene glycol, butyl glycol, butyl glycol acetate, butyl glycol diacetate, butyl diglycol, butylcarbitol, 1-methoxy-2-propanol, 2,2,2-trimethyl-1,3-pentanediol monoisobutyrate (Texanol®) and the glycol ethers and esters, commercially available, for example, from BASF SE under the Solvenon® and Lusolvan® names, and from Dow under the Dowanol® trade name. The amount is preferably <10% by weight and more preferably <5% by weight, based on the overall formulation. Formulation is also possible completely without solvents.

Further formulation ingredients for water-borne paints are described in detail in M. Schwartz and R. Baumstark "Water-based Acrylates for Decorative Coatings", Curt R. Vincentz Verlag, Hanover, 2001, p. 191-212 (ISBN 3-87870-726-6).

A further embodiment of the present invention are methods of producing a coating on a surface comprising
(a) applying the aqueous binder composition as described herein and/or the coating composition as described herein to the surface, and
(b) allowing the composition to dry to produce the coating.

The composition can be applied to surfaces and/or substrates to be coated in a customary manner such as for example by applying the paint with brushes or rolls, by spraying, by dipping, by rolling, or by bar coating. The coating of surfaces and/or substrates is effected in such a way that the surface and/or substrate is first coated with a composition of the invention and then the aqueous composition is subjected to a drying step.

The composition can be applied to surfaces such as for example metal, asphalt, concrete, fiber boards, stone, ceramic, minerals, wood, plastic, polymer, and glass. The composition can be applied to interior or exterior surfaces such as for example an architectural surface such as a roof, a wall, a floor, and a ceiling. Preferably, the composition can be applied to exterior surfaces.

Yet a further embodiment of the present invention is the use of a branched polyetheramine polyol as described herein, wherein essentially all of the amino groups in the branched polyetheramine polyol are tertiary amine groups, as an additive for an aqueous polymer latex of a film forming carboxylated polymer.

The branched polyetheramine polyols as described herein have superior effect relating the curing and/or hardening behavior of polymer binders such as film forming carboxylated polymers.

In particular, the branched polyetheramine polyols accelerate the film forming process at lower temperature below 20° C. whereas the film forming process at higher temperatures is slower or at least same. Thus, the hardening of the binder compositions according to the invention at temperatures below 20° C. is faster or at least same as compared to the hardening at temperatures above 20° C.

EXAMPLES

Abbreviations
EO ethylene oxide
GPC gel permeation chromatography
HFIP hexafluoroisopropanol
Mn number average molecular weight
Mw weight average molecular weight
PD polydispersity, defined as PD=Mw/Mn
PMMA polymethylmethacrylate
PS particle size
PDI polydispersity index of particle size distribution
DLS dynamic light scattering
s/s solid polymer additive based on solid polymer latex
rpm rotation per minute
Sc. Solid content
TEA triethanolamine
TIPA triisopropanolamine
Materials
Polystyrene seed latex S1: Polystyrene seed latex having a solid content of 33% by weight and a volume average particle diameter of 10 to 50 nm.
Emulsifier E1: Sodium dodecyl sulfonate—15% by weight aqueous solution.

Polyethylene imine PEI1: Lupasol FG of BASF SE—average molecular weight 600 g/mol.

Biocide 1: Biocide composition containing a mixture of 1,2-benzisothiazolin-3-one (5.0%) and 2-methyl-4-isothiazolin-3-one (2.5%)—Acticid MBS 2550 of Thor Specialties, Inc.

Biocide 2: Biocide composition containing a mixture of 5-chloro-2-methyl-2H-isothiazol-3-one and 2-methyl-2H-isothiazol-3-one (3:1)—Acticid MV of Thor Specialties, Inc.

Analysis

1. The solids content was determined by drying a defined amount of the aqueous polymer dispersion (about 2 g) to constant weight in an aluminum crucible having an internal diameter of about 5 cm at 120° C. in a drying cabinet (about 2 hours). Two separate measurements were conducted. The value reported in the example is the mean of the two measurements.
2. The particle diameter of the polymer latex was determined by dynamic light scattering of an aqueous polymer dispersion diluted with deionized water to 0.001 to 0.5% by weight at 22° C. by means of a High Performance Particle Sizer (HPPS) from Malvern Instruments, England. What is reported is the cumulant Z average diameter calculated from the measured autocorrelation function (ISO Standard 13321).
3. The glass transition temperature was determined by the DSC method (Differential Scanning Clorimetry, 20 K/min, midpoint measurement, DIN 53765:1994-03) by means of a DSC instrument (Q 2000 series from TA instruments).
4. The molecular weight was determined by GPC using a refractometer as the detector. The mobile phase used was HFIP, the standard employed for determining the molecular weight being PMMA.
5. The OH number of the polyether amine polyol was determined in accordance with DIN 53240, part 2.
6. The dynamic viscosity of the polyetheramine polyol was determined at 23° C. and a shear rate of 100 sec$^{-1}$ according to ASTM D7042.
7. The amine number was determined by a standard protocol according to DIN EN ISO 9702:1998.

Preparation Example 1

Carboxylated Latex (Disp1)

A polymerization reactor equipped with a temperature control module and a dosing module was charged with as follows:
p Initial charge 1
462.47 g water
45.5 g seed latex S1
Initial charge 2
8.74 g of a 7% by weight aqueous solution of sodium peroxodisulfate
Feed 1 was prepared in the first addition vessel by using the following components:
Feed/emulsion 1
569.1 g water
100.0 g emulsifier E1
19.5 g acrylic acid
636.5 g methyl methacrylate
750.0 g n-butyl acrylate Feed 2 was prepared in the second addition vessel by using the following components:
Feed 2
12.0 g methacrylic acid
37.5 g n-butyl acrylate
37.5 g styrene
Feed 3 was prepared in the third addition vessel by using the following mixture:
Feed 3
16.97 g of a 7% by weight aqueous solution of sodium peroxodisulfate The initial charge 1 was heated up (polymerization temperature: 90° C., stirring speed: 150 rpm). Initial charge 2 was then added to the initial charge 1 and the polymerization was left running for 5 minutes. Feed 1 and feed 3 were started at the same time and were fed continuously over 2 hours. 20 minutes after the feeding start of feed 1 and feed 3, feed 2 was fed over 5 minutes in the reactor.

After completion of the addition of feeds 1 and 3, 87.2 g of distilled water was added to the reactor and the reaction mixture was stirred additionally during 20 minutes. After the post polymerization was completed, 4.8 g of ammonia (25% solution in water) was added to the reaction mixture, which was then stirred for 5 minutes. Upon completion of the neutralization step, 9.0 g of 10% aqueous solution of tert-butyl hydroperoxide and 33.4 g of a 4.5% aqueous solution of acetone bisulfite were added over 1 hour. The resulting dispersion was then cooled down to room temperature, diluted with 104.9 g of distilled water and finally the conserved with 6.0 g of biocide 1 and 2.6 g of biocide 2. 2950.6 g of the corresponding aqueous dispersion was obtained.

Sc:51.9%; PS/PDI (DLS)=131 nm/0.01, pH=6.0

Preparation Example 2

Dispersion Disp2

A polymerization reactor equipped with a temperature control module and a dosing module was charged as follows:
Initial charge 1
406.56 g water
23.6 g seed latex S1
Feed 1 was prepared in the first addition vessel by using the following components:
Feed/emulsion 1
431.9 g water
86.67 g emulsifier E1
6.50 g 2-ethylhexyl thioglycolate
689.7 g methyl methacrylate
583.1 g 2-ethylhexyl acrylate
16.90 g acrylic acid
10.40 g methacrylic acid
Feed 2 was prepared in the second addition vessel by using the following mixture:
Feed 2
55.71 g of a 7% by weight aqueous solution of sodium peroxodisulfate The initial charge 1 was heated up (polymerization temperature: 85° C., stirring speed: 150 rpm). Feeds 1 and 2 were started at the same time and were fed continuously over 3 h. After the completion of the feeding of feeds 1 and 2, 76.8 g of distilled water was added to the reactor and the reaction mixture was stirred additionally during 20 min. After the post polymerization was completed, 7.8 g of 10% aqueous solution of tert-butyl hydroperoxide and 28.9 g of a 4.5% aqueous solution of acetone bisulfite were added over 1 h. The resulting dispersion was then cooled down to room temperature, neutralized with 30.4 g of 10% aqueous ammonia and diluted with 108.3 g of distilled water.

2570.6 g of the corresponding aqueous dispersion was obtained.

Sc:51.4%; PS/PDI (DLS)=159 nm/0.003; pH=8.4

Preparation Example 3

Dispersion Disp3

A polymerization reactor equipped with a temperature control module and a dosing module was charged as follows:
Initial charge 1
406.56 g water
23.6 g seed latex S1
Feed 1 was prepared in the first addition vessel by using the following components:
Feed/emulsion 1
215.9 g water
43.33 g Emulsifier E1
6.50 g 2-ethylhexyl thioglycolate
344.8 g methyl methacrylate
291.5 g 2-ethylhexyl acrylate
8.45 g acrylic acid
10.4 g methacrylic acid
Feed 2 was prepared in the second addition vessel by using the following components:
Feed 2
215.9 g Water
43.33 g Emulsifier E1
344.8 g methyl methacrylate
291.5 g 2-ethylhexyl acrylate
8.45 g acrylic acid
Feed 3 was prepared in the third addition vessel by using the following mixture:
Feed 3
55.7 g of a 7% by weight aqueous solution of sodium peroxodisulfate The initial charge 1 was heated up (polymerization temperature: 85° C., stirring speed: 150 rpm). Feeds 1 and 3 were started at the same time and were fed continuously over 1.5 h and 3 h, respectively. After the completion of the feed 1, feed 2 was immediately started and performed within 1.5 h. After completion of feeds 2 and 3, 76.8 g of distilled water was added to the reactor and the reaction mixture was stirred additionally during 20 min. After the post polymerization was completed, 7.8 g of 10% aqueous solution of tert-butyl hydroperoxide and 28.9 g of a 4.5% aqueous solution of acetone bisulfite were added over 1 h. The resulting dispersion was then cooled down to room temperature, neutralized with 30.4 g of 10% aqueous ammonia and diluted with 108.3 g of distilled water.

2570.6 g of the corresponding aqueous dispersion was obtained.

Sc:51.5%; PS/PDI (DLS)=166 nm/0.03; pH=8.4

Preparation Example 4

EO-Functionalized Polyethyleneimine (Comparative)

In a 2 L autoclave, 430 g of polyethyleneimine Lupasol FG and 43 g of water were heated to 80° C. The autoclave was then purged three times with nitrogen and brought to a final pressure of 2 bar. After increasing the temperature to 120° C., 369 g of ethyleneoxide were added in portions. After all the ethyleneoxide had been added, the temperature was maintained until the pressure of the reactor stabilized. All volatile compounds were then removed in vacuum at 90° C. 820 g of product were obtained.

Preparation Example 5

Synthesis of Polytriethanolamine from Triethanolamine

A four-neck flask equipped with stirrer, distillation bridge, gas inlet tube, and internal thermometer was charged with 2500 g TEA and 70.78 g of a 50% by weight aqueous $H_3PO_2$. The mixture so obtained was heated under nitrogen to 200° C. The reaction mixture was stirred at 200° C. over a period of 25 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature and the polytriethanolamine polyol was obtained.
Mn=3960 g/mol; Mw=39600 g/mol; Mw/Mn=15.1
OH number: 284 mg KOH/g
Total amine number: 426 mgKOH/g
Tertiary amine number: 426 mgKOH/g
Dynamic viscosity at 23° C.: 9100 mPa·s $1/100$ sec The amount of secondary and primary amino group was below the detection limit of 2 mgKOH/g, confirming that all amino groups present were tertiary amino groups.

Preparation Example 6

Synthesis of Polytriisopropanolamine from Triisopropanolamine

A four-neck flask equipped with stirrer, distillation bridge, gas inlet tube, and internal thermometer was charged with 2500 g TIPA and 29.96 g of a 50% by weight aqueous $H_3PO_2$. The mixture so obtained was heated under nitrogen to 200° C. The reaction mixture was stirred at 200° C. over a period of 10 hours, during which the condensate formed in the reaction is removed by means of a moderate stream of $N_2$ as stripping gas via the distillation bridge. Toward the end of the reaction time indicated, the temperature was lowered to 140° C. and residual low molecular weight products were removed under a pressure of 100 mbar.

Then, the reaction mixture was cooled to ambient temperature, and a polytrisopropanolamine polyol was obtained.
Mn=2550 g/mol; Mw=6180 g/mol; Mw/Mn=2.4
OH number: 498 mg KOH/g
Total amine number: 306 mgKOH/g
Tertiary amine number: 304 mgKOH/g (The amount of secondary and primary amino group was below the detection limit of 2 mgKOH/g, confirming that all amino groups present were tertiary amino groups)
Dynamic viscosity at 23° C.: 102000 mPa·s $1/100$ sec Comparative Example 1

Binder Composition of Latex Disp1+Polyethyleneimine

The binder composition of comparative example 1 was prepared by mixing the polymer latex of Preparation example 1 with 2% by weight (s/s) of polyethyleneimine PEI1 after the addition of the biocides.

Comparative Example 2

Binder Composition of Latex Disp1+Polyethyleneimine

The binder composition was prepared by analogy to comparative example 1, but the pH of the final composition was adjusted up to 7 using 25% of ammonia solution before addition of 2% (s/s) of polyethyleneimine PEI1. It was tried to measure the pH after completion of the addition but it was not measurable due to the instability of the mixture.

Comparative Example 3

Binder Composition of Latex Disp1+Polyethyleneimine

The binder composition was prepared by analogy to comparative example 1, but the pH of the final composition was adjusted up to 8 using 25% ammonia solution before addition of 2% (s/s) of polyethyleneimine PEI1. It was tried to measure the pH after completion of the addition but it was not measurable due to the instability of the mixture.

Comparative Example 4

Binder Composition of Latex Disp1+EO Functionalized PEI

The binder composition was prepared by analogy to comparative example 1, but 2% (s/s) of the 25% aqueous solution of preparation example 4 was added after the addition of the biocides. The pH after completion of the addition was 8.56.

Example 1

Binder Composition of Latex Disp1+Polytriethanolamine

The binder composition was prepared by analogy to comparative example 1, but 2% (s/s) of the 25% aqueous solution of polytriethanolamine from preparation example 5 was added after the addition of the biocides.

Example 2

Binder Composition of Latex Disp1+Polytriethanolamine

The binder composition was prepared by analogy to example 1, but the pH of the final composition was adjusted with 25% ammonia solution before addition of 2% (s/s) of the 25% aqueous solution of preparation example 5, so that a pH of 8.38 was achieved upon addition of the polytriethanolamine.

Example 3

Binder Composition of Latex Disp1+Polytriethanolamine

The binder composition was prepared by analogy to example 1, but the pH of the final dispersion was adjusted with 25% ammonia solution before addition of 2% (s/s) of the 25% aqueous solution of preparation example 5, so that a pH of 8.58 was achieved upon addition of the polytriethanolamine.

Example 4

Binder Composition of Latex Disp2+Polytriethanolamine

The binder composition was prepared by analogy to example 1, using latex Disp2 instead of latex Disp1.

Example 5

Binder Composition of Latex Disp3+Polytriethanolamine

The binder composition was prepared by analogy to example 1, using latex Disp3 instead of latex Disp1.
Stability Test The dispersion/compositions were stored for 14 days and 50° C. and the pH was measured before and after storage. Stability was determined visually. The results are summarized in the following table 1.

TABLE 1

|  | Example 3 | Comparative Example 1 | Comparative Example 4 |
|---|---|---|---|
| pH | 8.58 | coagulation | 8.56 |
| pH after 14 d at 50° C. | 8.48 | coagulation | thickening |

Yellowing

A film of each of the binder compositions of example 3 and comparative examples 1 and 4, respectively, was casted and the yellowing effect was analyzed visually.

Comparative Example 1: no films obtainable due to coagulation.
Comparative Example 4: severe yellowing of the films
Example 3: only very slight yellowing of the film
Drying Test (Early Rain Resistance)
Equipment: Glass carrier, 200 micron blade, climate chamber, stop clock
Test method: At the desired testing temperature, a film of 200 microns (wet) of paint or coating were applied onto the glass carrier. After application of the film, the coating was allowed to dry for 10 minutes.

10 minutes after the application of the film, the dryness of the coating was tested by pressing and releasing with a thumb with a comparable force and without any twisting. The damage to the coating surface was analyzed visually regarding tack and damage to surface. The testing of the film by pressing and releasing with a thumb was repeated every 5 minutes until no more tack and damage was detected. The results are summarized in table 2.

TABLE 2

|  |  | Example 3 | Comparative Example 1 | Comparative Example 4 |
|---|---|---|---|---|
| 23° C. | 10 min | 3 | Coagulation | 3 |
|  | 15 min | 2 | Coagulation | 2 |
|  | 20 min | 2 | Coagulation | 1 |
|  | 25 min | 1 | Coagulation | 0 |
|  | 30 min | 0 | Coagulation | 0 |

TABLE 2-continued

|  |  | Example 3 | Comparative Example 1 | Comparative Example 4 |
|---|---|---|---|---|
| 10° C. | 10 min | 2 | Coagulation | 2 |
|  | 15 min | 1 | Coagulation | 2 |
|  | 20 min | 0 | Coagulation | 1 |
|  | 25 min | 0 | Coagulation | 0 |
|  | 30 min | 0 | Coagulation | 0 |

Grading: From 0 to 3, whereas 3 corresponds to paint still wet, tacky, surface severely damaged and 0 corresponds to paint dry, no damages to surface.

The binder composition of example 3 according to the invention shows quicker drying behavior at low temperatures of 10° C., and a slightly slower drying behavior at medium temperatures of 23° C. compared to comparative example 4. The results are summarized in table 3:

TABLE 3

|  |  | Example 4 | Example 5 |
|---|---|---|---|
| 23° C. | 10 min | 3 | 3 |
|  | 15 min | 2 | 2 |
|  | 20 min | 2 | 1 |
|  | 25 min | 0 | 0 |
|  | 30 min | 0 | 0 |
| 15° C. | 10 min | 2 | 2 |
|  | 15 min | 2 | 2 |
|  | 20 min | 0 | 2 |
|  | 25 min | 0 | 0 |
|  | 30 min | 0 | 0 |

Grading: From 0 to 3, as explained in table 2.

The binder composition of example 4 shows quicker drying at 15° C. than at 23° C. having sufficient open time both at 15 and at 23° C. The binder composition of example 5 shows almost same drying behavior at 15° C. and at 23° C. having sufficient open time both at 15 and at 23° C.

The invention claimed is:

1. An aqueous binder composition comprising
(a) an aqueous polymer latex of a film forming carboxylated polymer;
(b) 0.05 to 7.5% by weight, based on the dry weight of the carboxylated polymer, of a branched polyetheramine polyol dissolved in the aqueous phase of the polymer latex, wherein essentially all of the amino groups in the branched polyetheramine polyol are tertiary amine groups, and wherein the branched polyetheramine polyol contains on average from 4 to 8.2 mol/kg of tertiary amino groups;
wherein the aqueous polymer latex of the carboxylated polymer is obtained by a radical emulsion polymerization of a monomer composition M, where the monomer composition M consists of
(a) 70% by weight to 99.95% by weight, based on the total weight of the monomer composition M, of one or more ethylenically unsaturated monomers M1, which are selected from $C_1$-$C_{20}$-alkyl esters of monoethylenically unsaturated monocarboxylic acids having 3 to 6 carbon atoms, di-$C_1$-$C_{20}$-alkyl esters of monoethylenically unsaturated dicarboxylic acids having 4 to 6 carbon atoms, $C_5$-$C_{20}$-cycloalkyl esters of monoethylenically unsaturated monocarboxylic acids having 3 to 6 carbon atoms, vinylesters of $C_1$-$C_{20}$-alkanoic acids, vinyl aromatic monomers, $C_2$-$C_6$ monoolefins and butadiene;
(b) 0.05% by weight to 10% by weight, based on the total weight of the monomer composition M, of one or more monoethylenically unsaturated monomers M2, which are selected from monoethylenicaly unsaturated monocarboxylic acids having 3 to 6 carbon atoms and monoethylenically unsaturated dicarboxylic acids having 4 to 6 carbon atoms; and
(c) 0% by weight to 20% by weight, based on the total weight of the monomer composition M, of one or more non-ionic monomers M3, which are different from monomers M1.

2. The binder composition according to claim 1, wherein the branched polyetheramine polyol has a OH number in the range of 100 to 800 mg KOH/g according to DIN 53240, part 2.

3. The binder composition according to claim 1, wherein the branched polyetheramine polyol has a number-average molecular weight $M_n$ in the range of from 500 to 55000 g/mol.

4. The binder composition according to claim 1, wherein the branched polyetheramine polyol is obtained by polycondensation of at least one trialkanolamine or a mixture of at least one trialkanolamine with an aliphatic or cycloaliphatic polyol.

5. The binder composition according to claim 1, wherein the monomers M1 are a mixture of
at least one monomer M1a, selected from $C_1$-$C_{20}$-alkyl esters of acrylic acid and $C_5$-$C_{20}$-alkylesters of methacrylic acid; and
at least one monomer M1b, selected from vinyl aromatic monomers, and $C_1$-$C_4$-alkyl esters of methacrylic acid and mixtures thereof.

6. The binder composition according to claim 1, wherein the monomers M2 are selected from acrylic acid, methacrylic acid, and mixtures thereof.

7. The binder composition according to claim 1, wherein the aqueous polymer latex of the carboxylated polymer is obtained by a radical emulsion polymerization of the monomer composition M, where at least 90% of the monomer composition M to be polymerized are metered to the polymerization reaction under polymerization conditions during a metering period P, and where the composition of the portion of the monomer composition M, which is metered to the polymerization reaction under polymerization conditions is changed at least once during the metering period P.

8. The binder composition of claim 1, wherein the branched polyetheramine polyol is present in the composition in an amount in the range from 0.1% by weight to 5% by weight based on the dry weight of the carboxylated polymer.

9. A water-borne coating composition containing the aqueous binder composition according to claim 1.

10. The coating composition according to claim 9, further containing at least a pigment, and/or at least a filler.

11. A method for producing a water-borne coating composition, comprising providing the aqueous binder composition according to claim 1 as a binder or co-binder and forming a water-borne coating composition.

12. A method of producing a coating on a surface comprising
(a) applying the aqueous binder composition according to claim 1 or the coating composition according to claim 9 to a surface, and
(b) allowing the aqueous binder composition or coating composition to dry to produce the coating on the surface.

* * * * *